United States Patent
Uchida et al.

(10) Patent No.: US 6,441,528 B1
(45) Date of Patent: *Aug. 27, 2002

(54) SYNCHRONOUS MOTORS OF DIFFERENT KINDS

(75) Inventors: Hiroyuki Uchida, Minamitsuru-gun; Takashi Okamoto; Tomonaga Yamamoto, both of Oshino-mura, all of (JP)

(73) Assignee: Fanuc Ltd., Yamanashi (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/155,015

(22) PCT Filed: Jan. 16, 1998

(86) PCT No.: PCT/JP98/00137

§ 371 (c)(1),
(2), (4) Date: Sep. 16, 1998

(87) PCT Pub. No.: WO98/32212

PCT Pub. Date: Jul. 23, 1998

(30) Foreign Application Priority Data

Jan. 16, 1997 (JP) ............................................ 9-17784

(51) Int. Cl.⁷ ................................................ H02K 1/00
(52) U.S. Cl. ........................ 310/216; 310/217; 310/254; 310/261
(58) Field of Search .......................... 29/596, 598, 597; 310/42, 216, 217, 254, 261

(56) References Cited

U.S. PATENT DOCUMENTS

| 3,956,650 | A |   | 5/1976 | Field, II |
|-----------|---|---|--------|-----------|
| 5,091,668 | A |   | 2/1992 | Cuenot et al. |
| 5,203,070 | A | * | 4/1993 | Montgomery et al. ........ 29/596 |
| 5,875,540 | A | * | 3/1999 | Sargeant et al. .............. 29/596 |

FOREIGN PATENT DOCUMENTS

| JP | 56-46654  | 4/1981 |
| JP | 3-26272   | 3/1991 |
| JP | 5-137304  | 6/1993 |
| JP | 6-245451  | 9/1994 |
| JP | 7-46802   | 2/1995 |

* cited by examiner

*Primary Examiner*—Carl J. Arbes
(74) *Attorney, Agent, or Firm*—Staas & Halsey LLP

(57) ABSTRACT

A method of expanding types of synchronous motors capable of reducing the number of required stator types to use stators in common, and a synchronous motor produced by the method. A group of stators are prepared by stacking stator cores of identical shape so that heights of the stators are different from one another to be multiples of a fundamental height. A plurality of groups of rotors are prepared so that lengths of the rotors in each group are different from one another to be multiples of a fundamental length. The rotors in each group are provided with permanent magnets having a residual magnetic flux density different from that of the permanent magnets of the rotors in the other groups. A stator and a rotor corresponding to a preset output torque specification value and a preset rotor inertia specification value are respectively selected from the group of stators and the rotor groups and are combined with each other, whereby an expanded type of motor is obtained.

12 Claims, 6 Drawing Sheets

SYNCHRONOUS MOTORS OF DIFFERENT KINDS

TECHNICAL FIELD

The present invention relates to a method of expanding types of synchronous motors to obtain synchronous motors having different specification values with respect to torque and/or inertia, and synchronous motors produced by the method.

BACKGROUND ART

As an alternating-current motor, there is known a synchronous motor comprising a rotor having permanent magnets therein and a stator having windings thereon. In setting types of synchronous motors, motor characteristics of torque and rotor inertia are determined to have different specification values in series of motors, to thereby obtain expanded types of synchronous motors.

There are defined a variety of series such as a standard series having standard specification values of torque and rotor inertia, a low-inertia series having a small rotor inertia specification value relative to the torque specification value, and a high-torque series having a large torque specification value relative to the rotor inertia specification value, and motors in each series have output torque and rotor inertia values different from one another to be approximate multiples of that of the other one.

FIGS. 4a and 4b illustrate the arrangements of conventional synchronous motors, wherein FIG. 4a shows the combination of a stator and a rotor for constructing a standard-series motor having standard specification values of torque and rotor inertia, and FIG. 4b shows the combination of a stator and a rotor for constructing a low-inertia series motor having a smaller rotor inertia specification value.

In FIG. 4a, a standard series synchronous motor 10 is constituted by combination of a stator 11 and a rotor 12. The stator 11 comprises a stack of steel plates with an overall height H, each steel plate having a center hole 15 for receiving the rotor 12 therein and grooves 13 for fitting windings on an inner periphery of the hole 15. The rotor 12 has a diameter $h_1$, such that it can be inserted into the hole 15 of the stator 11, and has permanent magnets 14 arranged circumferentially.

A low-inertia series synchronous motor 20 shown in FIG. 4b is constituted by combination of a stator 21 and a rotor 22. The stator 21 comprises a stack of steel plates with the overall height H, each steel plate having a center hole 25 for receiving the rotor 22 therein and grooves 23 for fitting windings on the inner periphery of the hole 25. The rotor 22 has a diameter $h_2$ such that it can be inserted into the hole 25 of the stator 21, and has permanent magnets 24 arranged circumferentially. To reduce the rotor inertia, the diameter $h_2$ of the rotor 22 is smaller than the diameter $h_1$ of the rotor 12 for the standard series, and the stator 21 also has a smaller inner diameter corresponding to the small diameter $h_2$ of the rotor 22. Generally, the permanent magnets 14 and 24 used in the rotors of the conventional synchronous motors are made of a magnetic material such as ferrite.

Thus, the conventional synchronous motor has a construction such that one stator shape is associated with one type of rotor to be inserted into the stator, and the synchronous motor characteristics and the stator shape are in one-to-one relation. Each series of synchronous motors is therefore constructed by the selective combination of one of groups of stators having an identical sectional shape but different stack lengths, with rotors associated with the selected stator group.

FIGS. 5 and 6 illustrate a conventional method for expanding types of synchronous motor, wherein FIG. 5 shows stator groups and rotor groups in the conventional method, and FIG. 6 shows standard-series motors and low-inertia series motors constructed by combining the stator groups and the rotor groups.

In FIG. 5, the stator groups and the rotor groups are shown on the left-hand and right-hand sides of the figure, respectively. The stator groups consist of a large-diameter stator group including stators SA, SB, SC and SD having a large-diameter hole for receiving a rotor therein, and a small-diameter stator group including stators Sa, Sb and Sc having a small-diameter hole for receiving a rotor therein. For the rotor groups, two different outer diameters, that is, large and small outer diameters, are set in accordance with to the rotor inertia, and thus the rotor groups consist of a large-diameter rotor group including rotors RA, RB, RC and RD having large diameters, and a small-diameter rotor group including rotors Ra, Rb and Rc having small diameters. The stators and the rotors have their diameters and lengths set in accordance with characteristics of synchronous motors to be obtained.

The heights of the stators SA–SD and the rotors RA–RD are set to be multiples of L, i.e., L, 2L, 4L, 8L, . . . and the heights of the stators Sa–Sc and the rotors Ra–Rc are set to be multiples of L, i.e., L, 2L, 4L, . . . .

To construct a plurality of series of synchronous motors using stator groups having respective identical sectional shapes and different stack lengths, stator-rotor combinations are selected from among the stator and rotor groups shown in FIG. 5 in accordance with required synchronous motor characteristics, thereby obtaining synchronous motors of standard series and low-inertia series as shown in FIG. 6. In FIG. 6, the right-hand side shows standard series motors having standard torque and rotor inertia specification values, and the left-hand side shows low-inertia series motors having relatively small rotor inertia specification values. Each series aligned in a column comprises stator-rotor combinations of which the torque values and inertia values are respectively different from one another to be multiples of a fundamental value.

For example, in a first row across the two series (the uppermost horizontal combination), a standard series motor has a rotor inertia specification value of J and a torque specification value of T. To construct a low-inertia series motor having a smaller rotor inertia specification value, a stator and a rotor both having a smaller diameter are selected and combined, whereby an expanded type of synchronous motor is obtained.

In the conventional method of expanding synchronous motor types, one stator shape is associated with one type of rotor to be inserted in the stator and the synchronous motor characteristics and the stator shape are in one-to-one relation, as stated above. Accordingly, to construct a series of synchronous motors using a group of stators having the same sectional shape but different stack lengths, as many stator types as the rotor types are required, giving rise to a problem that a large number of types of stators are needed.

The conventional method for expanding synchronous motor types also has a problem that when the stator height and the rotor length are changed in order to alter the torque specification value, the rotor inertia also changes with the change of the stator height and the rotor length.

TABLE 1

| | | Torque | | |
|---|---|---|---|---|
| | | T | 2T | 4T |
| Rotor Inertia | J/2 | Low-inertia Series a ⇧ | | |
| | J | Standard Series A | Low-inertia Series b ⇧ | |
| | 2J | | Standard Series B | Low-inertia Series c ⇧ |
| | 4J | | | Standard Series C |
| | 8J | | | |

Table 1 above shows how respective torque and rotor inertia specification values are achieved by the standard series motors and the low-inertia series motors according to the conventional synchronous motor type expansion method. For example, a motor with the torque specification value T and the rotor inertia specification value J can be realized by a standard series type A, and a motor with the torque specification value T and the rotor inertia specification value J/2 can be realized by a low-inertia series type a. In Table 1, symbols A to C and a to c affixed to the end of the respective series names denote motor types of which the stator-rotor combinations are shown in FIG. 6.

Referring to Table 1, in the case where the torque specification value of the standard series type A is required to be changed to 2T, such requirement can be satisfied by the standard series type B in the conventional synchronous motor type expansion method, as indicated by the broken-line arrow. However, in this case, not only the torque but the rotor inertia increases doubly, and it is not possible to change only the torque specification value without changing the rotor inertia.

DISCLOSURE OF INVENTION

An object of the present invention is to reduce the number of stator types needed and thereby permit stators to be used in common in cases where a plurality of series of motors are constructed by using a group of stators having an identical sectional shape and different stack lengths. Another object of the invention is to cut down the cost of expanding synchronous motor types by the common use of stators.

Still another object of the present invention is to permit expansion of synchronous motor types in such a manner that only the torque specification value or only the rotor inertia specification value can be changed.

A synchronous motor type expansion method of the present invention comprises the step of: preparing a group of stators by stacking stator cores of identical shape so that heights of the stators are different from one another to be multiples of a fundamental height in accordance with predetermined output torque specification values and predetermined rotor inertia specification values; preparing a plurality of groups of rotors so that lengths of the rotors in each group are different from one another to be multiples of a fundamental length in accordance with the predetermined rotor inertia specification values, the rotors in each group being provided with permanent magnets having a residual magnetic flux density different from that of permanent magnets of the rotors in another group in accordance with the preset output torque specification values; selecting a stator from the prepared group of stators and a rotor from the prepared groups of rotors in accordance with a preset output torque specification value and a preset rotor inertia specification value and combining the selected stator with the selected rotor.

According to the motor type expansion method of the present invention, a stator and a rotor are selected in accordance with desired torque and rotor inertia for a synchronous motor to be constituted from the group of stators and the groups of rotors prepared in advance, and are combined with each other. Each stator in the stator group can be formed by a single type of stator cores having an identical shape to have different height, so that the number of stator types is reduced, permitting the stators to use in common.

Various stators in the stator group necessary for expanding the motor type can be formed by changing only the number of stator cores of identical shape to be stacked, and thus the stator cores can be used in common. Various rotors in the rotor groups necessary for expanding the motor type can be prepared by a combination of different residual magnetic flux densities of permanent magnets and different rotor lengths.

For changing the rotor inertia value according to the motor type expansion method of the present invention, the residual magnetic flux density of permanent magnets and the rotor length are altered to thereby change the rotor inertia value without changing the torque value. On the other hand, for changing the torque value, the residual magnetic flux density of permanent magnets is altered to thereby change the torque value without changing the rotor inertia value.

According to the motor type expansion method of the present invention, a plurality of series of synchronous motors are produced using the group of stators having an identical shape and different stack lengths to permit the stators to be used in common, thus making it possible to reduce the number of stator types to produce synchronous motors at low cost.

The permanent magnets are arranged radially with respect to the rotor. In this case, the permanent magnets are attached to the rotor in various ways; for example, they may be affixed to the surface of the rotor or be embedded in the core of the rotor.

BEST MODE OF CARRYING OUT THE INVENTION

Figure 1A:
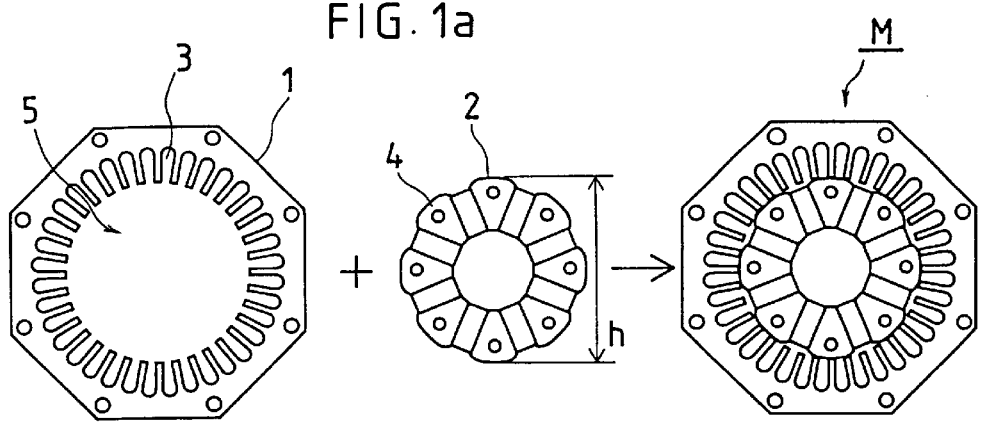
FIGS. 1a to 1c are diagrams showing different stator-rotor combinations according to a synchronous motor type expansion method of the present invention.
Figure 1A:
Figure 1B:
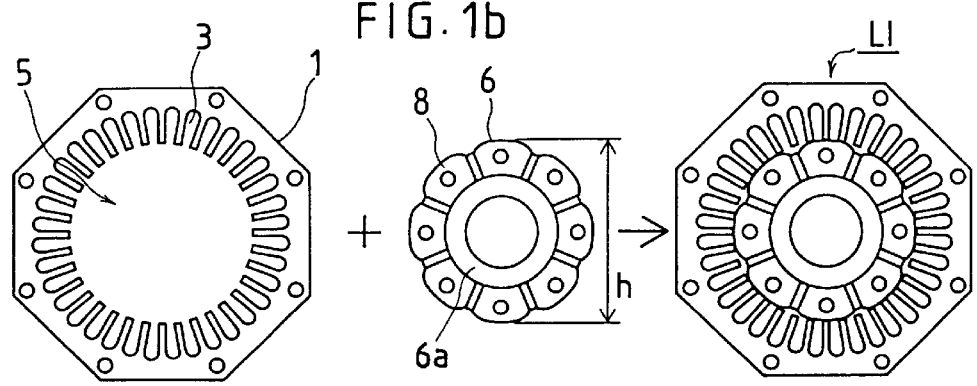
Figure 1B:
Figure 1C:
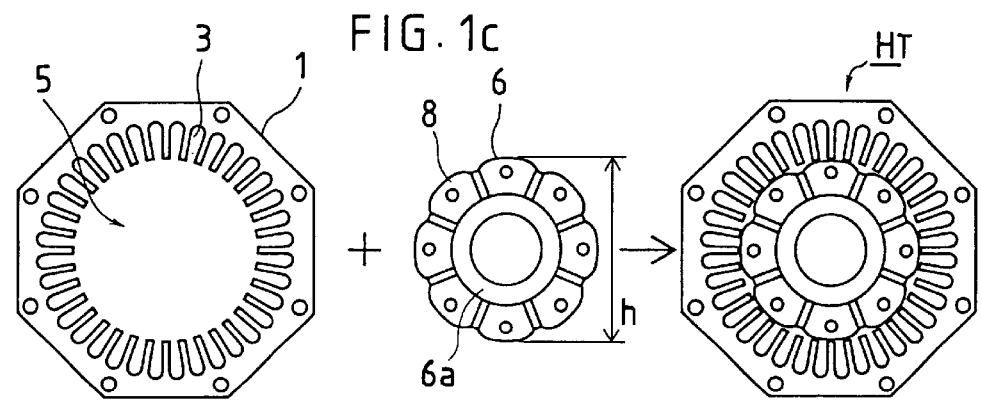
Figure 1C:
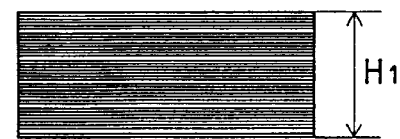

As shown in FIGS. 1a to 1c, a synchronous motor of the present invention is constituted by combining a rotor having permanent magnets therein with a stator having windings fitted thereon. In constructing a plurality of series of synchronous motors using a plurality of stators having an identical sectional shape and different stack lengths to thereby expand motor types, motor characteristics with respect to torque and rotor inertia are set to have different specification values in series of motors.

The following explains an example of motor type expansion, wherein various motor series are constituted by a standard series in which the torque and the rotor inertia are set to respective standard specification values, a low-inertia series in which the rotor inertia specification value is small relative to the torque specification value, and a high-torque series in which the torque specification value is large relative to the rotor inertia specification value, and motors in each series are designed so that their output torque value or rotor inertia value is different from one another to be approximate values obtained by multiplying a fundamental value by integers.

FIG. 1a shows the combination of a stator and a rotor used for constructing a standard series motor having standard torque and rotor inertia specification values. FIG. 1b shows a stator-rotor combination used for constructing a low-inertia series motor having a relatively small rotor inertia specification value, and FIG. 1c shows a stator-rotor combination used for constructing a high-torque series motor having a relatively large torque specification value.

In FIG. 1a, a standard series synchronous motor M is constructed by combining a stator 1 with a rotor 2. The stator 1 is formed by stacking stator cores, each comprising a steel plate having a center hole 5 for receiving the rotor 2 therein and grooves 3 for fitting windings on the inner periphery of the hole 5, one upon another up to a stator height $H_1$. The rotor 2 has a diameter h such that it can be inserted in the hole 5 of the stator 1, and has permanent magnets 4 arranged circumferentially. The rotor 2 is formed so that its rotor length may be equal to the stator height $H_1$ of the stator 1.

A low-inertia series synchronous motor LI shown in FIG. 1b is constructed by combining a stator 1 with a rotor 6. Like the stator 1 for the standard series shown in FIG. 1a, this stator 1 is formed using stator cores each of which comprises a steel plate having a center hole 5 for receiving the rotor 6 therein and grooves 3 for fitting windings on the inner periphery of the hole 5, but the stator cores are stacked up to a stator height $H_2$. The rotor 6 has the same diameter h as that of the rotor 2 for the standard series shown in FIG. 1a so that the rotor can be inserted in the hole 5 of the stator 1, and has permanent magnets 8 arranged circumferentially. Since the stator 1 for the low-inertia series and that for the standard series have an identical sectional shape, the rotors 6 and 2 have the same outer diameter, but the residual magnetic flux density of the permanent magnets 8 differs from that of the counterpart. The rotor 6 is formed so that its rotor length may be equal to the stator height $H_2$ of the stator 1.

In FIG. 1c, a high-torque series synchronous motor HT is constructed by combining a stator 1 with a rotor 6. The stator 1 and the rotor 6 are identical in structure with the corresponding ones for the low-inertia series shown in FIG. 1b, except that the stator height and the rotor length are different and are equal to $H_1$. Also, the rotor 6 is formed so that its rotor length may be equal to the stator height $H_1$ of the stator 1.

As permanent magnets, various kinds of magnets having different residual magnetic flux densities, such as ferrite magnet or neodymium-iron-boron magnet ($Nd_2Fe_{14}B$) with high residual magnetic flux de for example, are known and may be selectively used in accordance with the torque specification values. In the rotors 2 and 6 shown in FIG. 1, the permanent magnets used are different in their material etc. so that the residual magnetic flux densities may be different from each other.

As shown in FIGS. 1a to 1c, the permanent magnets 4, 8 are arranged radially with respect to the rotor 2, 6. In this case, for rotors belonging to a rotor group using the permanent magnets with the same residual magnetic flux density, the permanent magnets 4, 8 are radially located at identical positions in circumferential and radial directions of the rotor 2, 6.

The permanent magnets 8 may be affixed to the surface of a rotor body 6a by an adhesive material or the like, as shown in FIGS. 1b and 1c. To this end, radial recesses may be formed in the surface of the rotor and permanent magnets may be fitted in the respective recesses. Alternatively, permanent magnets may be embedded in the rotor body 6a. In this case, radial or axial holes are cut in the rotor core so that permanent magnets may be fitted into the respective holes.

The synchronous motors according to the present invention have a construction such that one stator shape is associated with a plurality of types of rotors to be inserted in the stator, and the stators used have an identical sectional shape regardless of the synchronous motor characteristics. Where a plurality of series of synchronous motors are constructed using a group of stators having an identical sectional shape and different stack lengths, stators and rotors corresponding to respective ones of set output torque specification values and set rotor inertia specification values are selected from among the group of stators having different stator heights equal to respective ones of integral multiples of a fundamental height, and groups of rotors of different types having different rotor lengths equal to respective ones of integral multiples of a fundamental length and having different combinations of residual magnetic flux density of permanent magnets and rotor length, and the selected stators and rotors are combined with each other.

Figure 2:
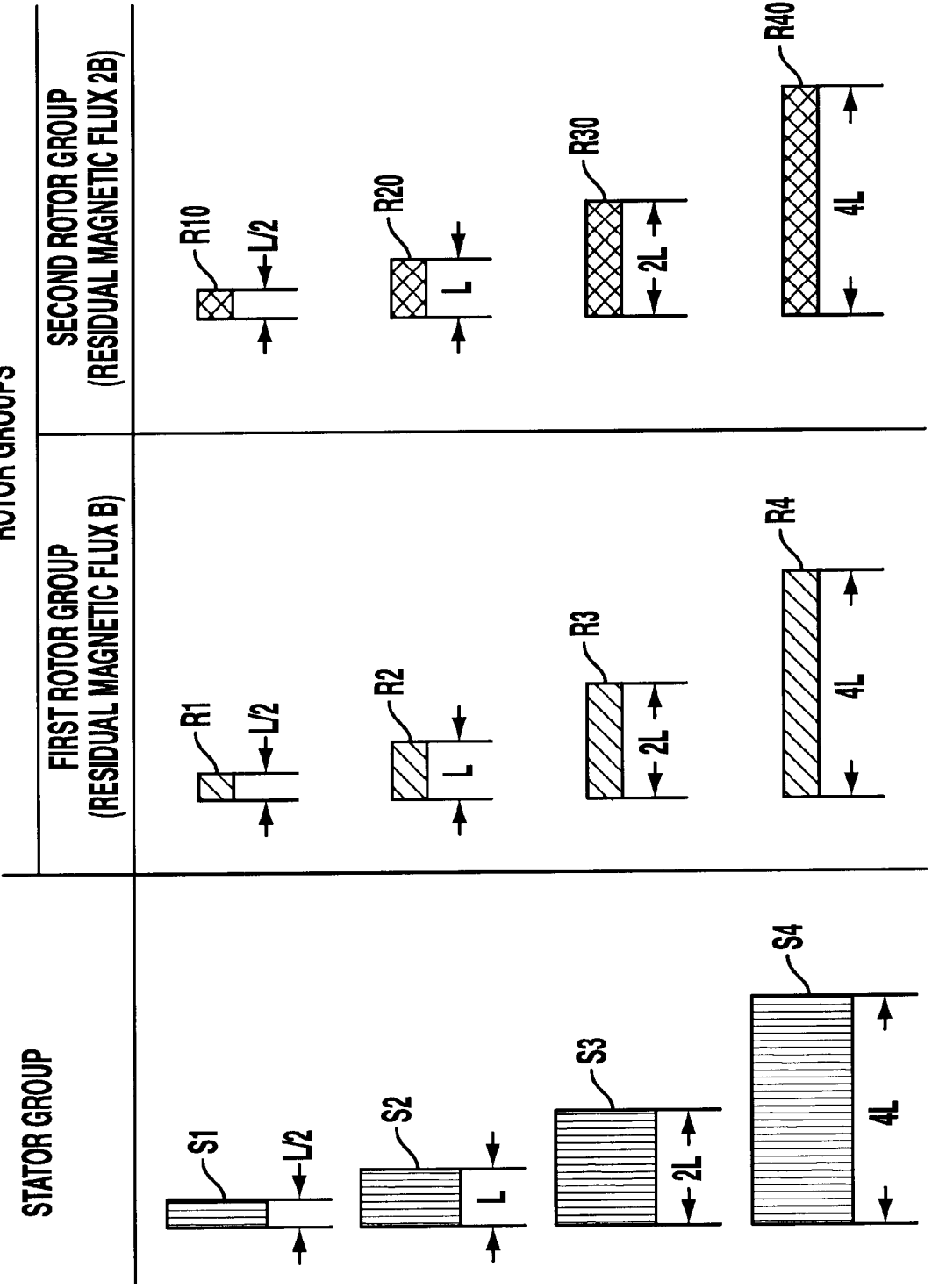
FIG. 2 is a diagram showing a stator group and rotor groups used in the motor type expansion method of the present invention.
Figure 3:
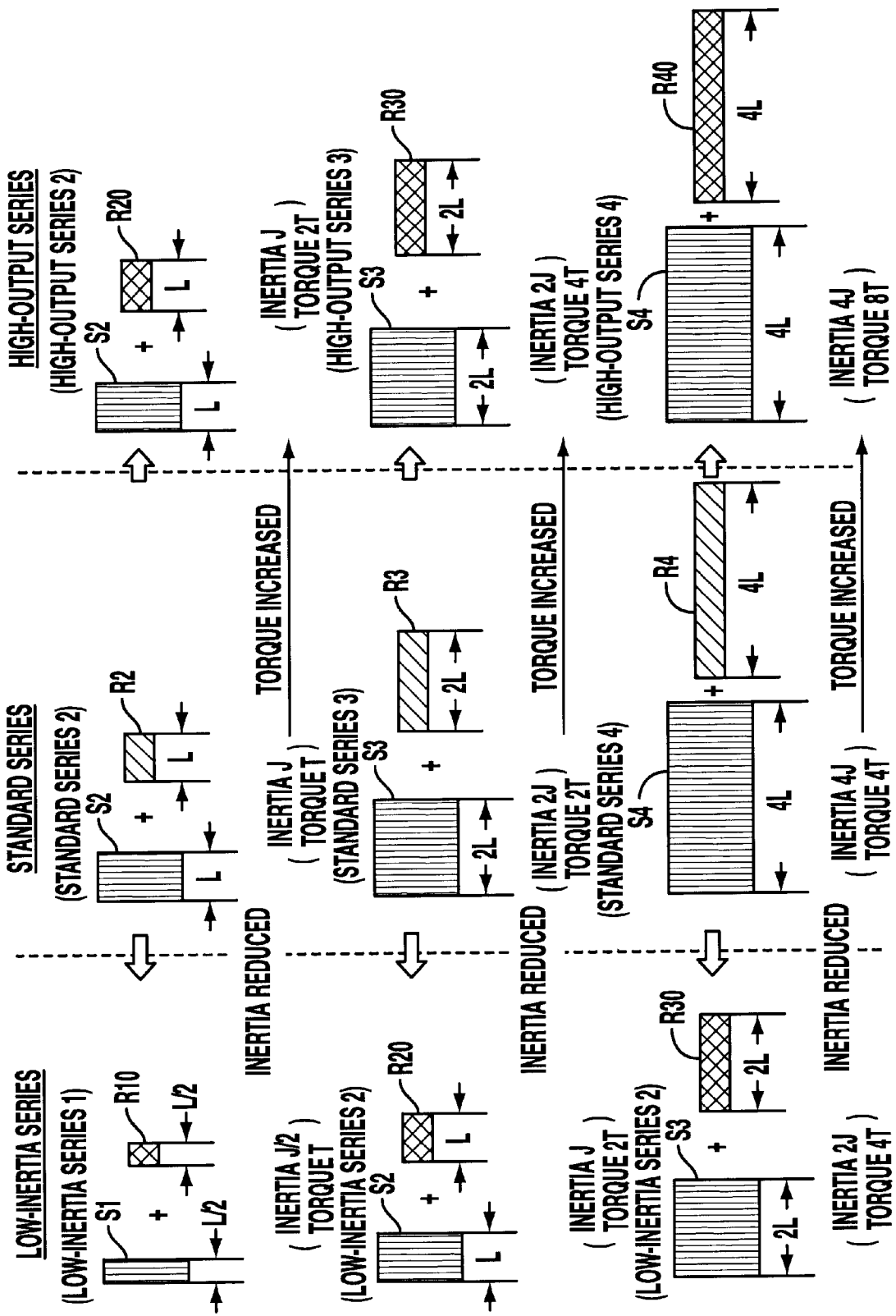
FIG. 3 is a diagram showing various stator-rotor combinations for constituting standard series, low-inertia series and high-torque series of synchronous motors according to the motor type expansion method of the present invention.
Figure 4A:
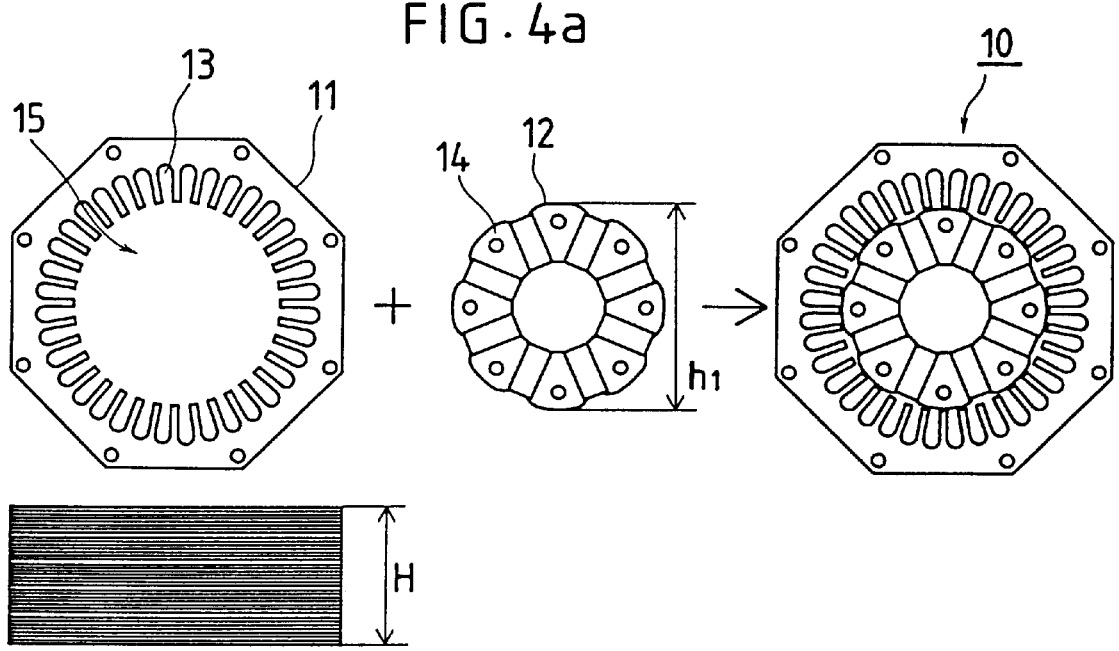
FIGS. 4a and 4b are diagrams illustrating a conventional method of expanding synchronous motor types.
Figure 4B:
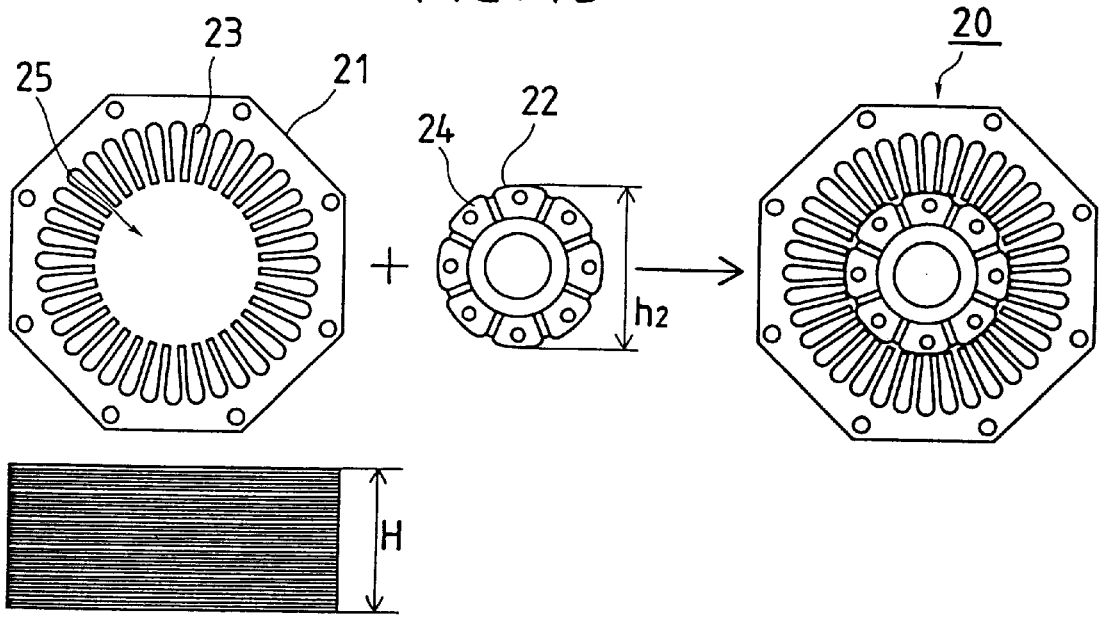
Figure 5:
FIG. 5 is a diagram showing stator groups and rotor groups used in the conventional motor type expansion method.
Figure 6:
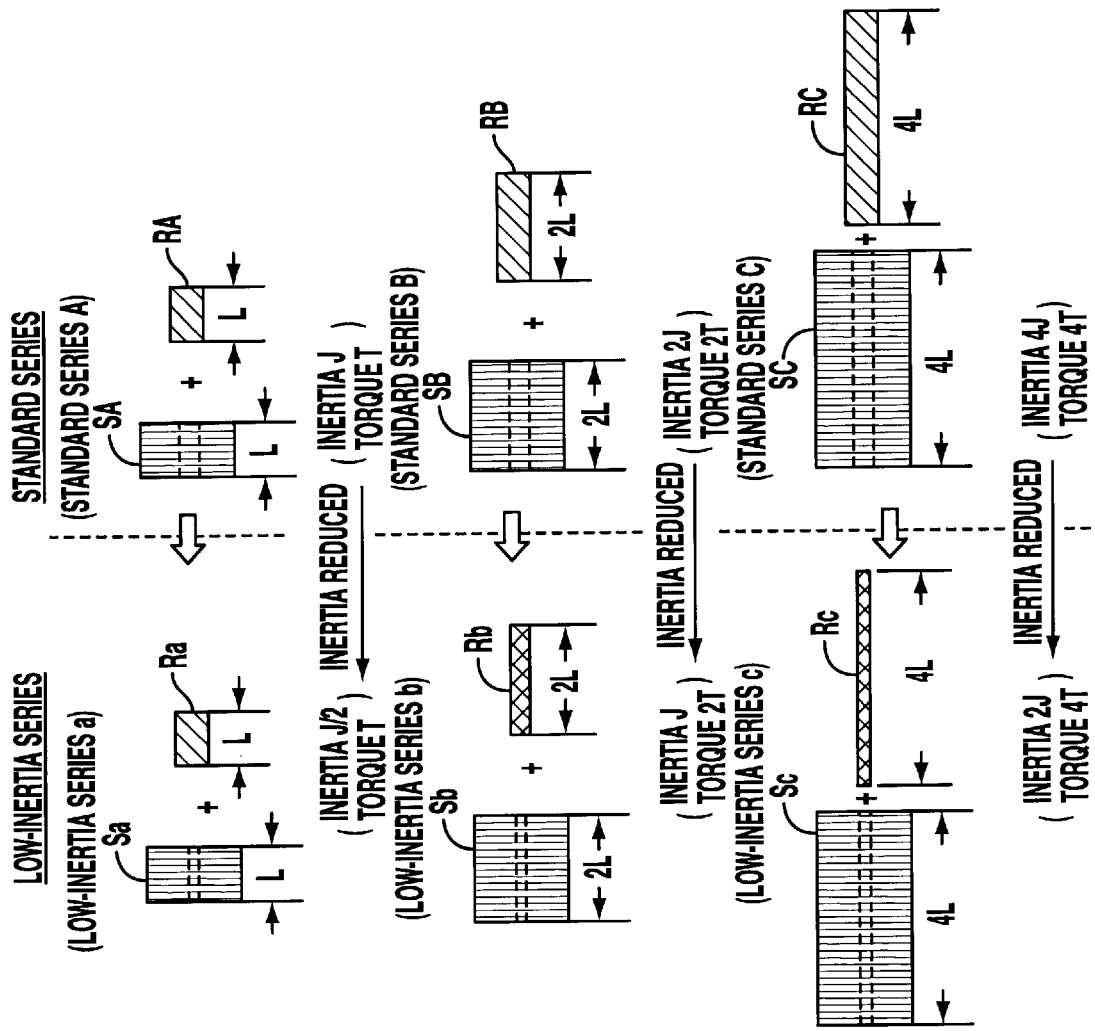
FIG. 6 is a diagram showing stator-rotor combinations for constituting standard series and low-inertia series of synchronous motors according to the conventional motor type expansion method.

FIGS. 2 and 3 illustrate expansion of synchronous motor types according to the present invention, wherein FIG. 2 shows a stator group and rotor groups for synchronous motors according to the present invention and FIG. 3 shows various stator-rotor combinations selected from the stator group and the rotor groups to construct motors of standard series, low-inertia series and high-torque series.

In FIG. 2, the leftmost column shows a stator group and the right-hand two columns show respective rotor groups. Stators in the stator group are formed using stator cores with an identical sectional shape, but different numbers of stator cores are stacked up to provide different stator heights. Rotors which have an identical diameter matching the hole in the stators are classified according to residual magnetic flux density into a first group of rotors R1 to R4 using permanent magnets with a residual magnetic flux density B and a second group of rotors R10 to R40 using permanent magnets with a residual magnetic flux density 2B. The stators and the rotors have different lengths set in accordance with the synchronous motor characteristics.

The heights of the stators S1, S2, S3 and S4 and the heights of the rotors R1, R2, R3, R4, R10, R20, R30 and R40 are set so as to be equal to respective ones of multiples of L/2, that is, L/2, L, 2L, 4L, etc.

To construct a plurality of series of synchronous motors by using the group of stators having the same sectional shape and different stack lengths, stators and rotors are selected in accordance with respective synchronous motor characteristics, from among the stator group and the rotor groups shown in FIG. 2, and the selected stators and rotors are combined with each other as shown in FIG. 3, whereby standard series, low-inertia series and high-torque series of synchronous motors are constructed.

Distinction between the low-inertia series and the high-torque series is whether the output or size is the same as that of the standard series, and the two series use substantially identical combinations.

In FIG. 3, the central part shows standard series motors having standard torque and rotor inertia specification values, the left-hand part shows low-inertia series motors having relatively small rotor inertia specification values, and the right-hand part shows high-torque series motors having relatively large torque specification values. The motors in each series, shown top to bottom in the figure, indicate stator-rotor combinations of which the torque values and inertia values are respectively different from one another and are equal to integral multiples of their respective fundamental values.

For example, in the first row across the three series (the uppermost horizontal combination in FIG. 3), the standard series motor with a rotor inertia specification value J and a torque specification value T is constructed by combining the stator S2 having the stator height L, selected from the stator group, with the rotor R2 having the rotor length L and using permanent magnets with the residual magnetic flux density B, selected from the rotor groups. To construct a low-inertia series motor corresponding to this standard series motor with the rotor inertia specification value reduced, the stator S1 having half the above stator height, that is, L/2, is selected from the stator group, the rotor R10 having the rotor length L/2 and using permanent magnets with the residual magnetic flux density 2B is selected from the rotor groups, and the thus-selected stator and rotor are combined with each other. Thus, the inertia value alone can be reduced by half without changing the torque value.

To construct a high-torque series motor having a larger torque specification value, the stator S2 with the stator height L is selected from the stator group, the rotor R20 having the rotor length L and using permanent magnets with the residual magnetic flux density 2B is selected from the rotor groups, and the selected stator and rotor are combined with each other, whereby the torque value alone can be doubled without changing the inertia value.

Similarly, in the second row across the three series (the second horizontal combination in the figure), the standard series motor with a rotor inertia specification value 2J and a torque specification value 2T is constructed by combining the stator S3 having the stator height 2L, selected from the stator group, with the rotor R3 having the rotor length 2L and using permanent magnets with the residual magnetic flux density B, selected from the rotor groups. To construct a low-inertia series motor corresponding to this standard series motor with the rotor inertia specification value reduced, the stator S2 having half the above stator height, that is, L, is selected from the stator group, the rotor R20 having the rotor length L and using permanent magnets with the residual magnetic flux density 2B is selected from the rotor groups, and the selected stator and rotor are combined with each other. Thus, the inertia value alone can be reduced by half without changing the torque value. On the other hand, in order to construct a high-torque series motor with a larger torque specification value, the stator S3 having the stator height 2L is selected from the stator group, the rotor R30 having the rotor length 2L and using permanent magnets with the residual magnetic flux density 2B is selected from the rotor groups, and the stator and the rotor selected in this manner are combined with each other, whereby only the torque value can be doubled without changing the inertia value.

Other expanded types of synchronous motors can be constructed in a like manner by using stators having an identical sectional shape.

TABLE 2

| | | Torque | | | |
|---|---|---|---|---|---|
| | | T | 2T | 4T | 8T |
| Rotor Inertia | J/2 | Low-inertia Series 1 ⇧ | | | |
| | J | Standard Series 2 ----▶ | High-Torque or Low-inertia Series 2 ⇧ | | |
| | 2J | | Standard Series 3 ----▶ | High-Torque or Low-inertia Series 3 ⇧ | |
| | 4J | | | Standard Series 4 ----▶ | High-torque Series 4 |

Table 2 above shows how respective torque and rotor inertia specification values are achieved by the standard series motors, the low-inertia series motors and high-torque series motors according to the synchronous motor type expansion method of the present invention. For example, a motor with the torque specification value T and the rotor inertia specification value J can be realized by the standard series type 2, and a motor with the torque specification value T and the rotor inertia specification value J/2 can be realized by the low-inertia series type 1. In Table 2, numerals 1 to 4 affixed to the end of the respective series names denote motor types of which the stator-rotor combinations are shown in FIG. 3.

Referring to Table 2, when it is required that the torque specification value of the standard series type 2 is changed to 2T, such requirement can be satisfied by the high-torque or low-inertia series type 2 according to the synchronous motor type expansion method of the present invention, without changing the rotor inertia value, as indicated by the broken-line arrow in the table. Also, when it is required that the rotor inertia specification value of the standard series type 2 is changed to J/2, the requirement can be satisfied by the low-inertia series type 1 without changing the torque value, as indicated by the outline arrow in the table.

Table 2 also shows that a synchronous motor having an identical rotor inertia value but a different torque value can be constructed by selecting the magnitude of the residual magnetic flux density of permanent magnets attached to the rotor.

According to the present invention, in constituting a plurality of series of synchronous motors using a group of stators having an identical sectional shape and different stack lengths, the number of required stator types is reduced, thus permitting the stators to be used in common, and also the cost of expanding synchronous motor types is lowered.

In addition, when expanding synchronous motor types, it is possible to change only the torque specification value or the rotor inertia specification value.

What is claimed:

1. A plurality of synchronous motors of different kinds, each having a stator formed by stacking stator cores and a rotor with permanent magnets, said synchronous motors being produced by a method comprising:

(a) preparing a group of stators, each stator being formed by stacking stator cores of identical shape so that heights of the stators are different from one another, the heights being equal to integer multiples of a predetermined height in accordance with predetermined output torque specification values and predetermined rotor inertia specification values;

(b) preparing a plurality of groups of rotors so that lengths of the rotors in each group are different from one another, the lengths being equal to integer multiples of a predetermined length in accordance with predetermined rotor inertia specification values, said rotors in each group being provided with permanent magnets having a residual magnetic flux density different from that of permanent magnets of the rotors in another group in accordance with predetermined output torque specification values, each of said rotors having an identical outer diameter; and (c) selecting a stator from said group of the stators prepared in step (a) and a rotor from said groups of the rotors prepared in step (b) in accordance with a preset output torque specification value and a preset rotor inertia specification value, and combining the selected stator with the selected rotor, in different combinations of the rotor and the stator for each of the different kinds of the synchronous motors, each of said stator and said rotor being selected such that a length of the selected rotor is equal to a height of the selected stator.

2. The plurality of synchronous motors of different kinds according to claim 1, wherein the permanent magnets provided in the rotors in each group are radially arranged at identical positions in circumferential and radial directions.

3. The plurality of synchronous motors of different kinds according to claim 1, wherein the permanent magnets are affixed to a surface of each rotor.

4. The plurality of synchronous motors of different kinds according to claim 1, wherein the permanent magnets are embedded in a core of each rotor.

5. The plurality of synchronous motors as in claim 1, wherein the residual magnetic flux densities vary based upon material used in the permanent magnets.

6. The plurality of synchronous motors as in claim 1, wherein the permanent magnets comprise ferrite magnet.

7. The plurality of synchronous motors as in claim 1, wherein the permanent magnets comprise neodymium-iron-boron magnet.

8. The plurality of synchronous motors as in claim 1, wherein the permanent magnets are arranged radially with respect to the rotors.

9. The plurality of synchronous motors as in claim 1, wherein the different kinds of the synchronous motors comprise a standard series motor.

10. The plurality of synchronous motors as in claim 1, wherein the different kinds of the synchronous motors comprise a low-inertia series motor.

11. The plurality of synchronous motors as in claim 1, wherein the different kinds of the synchronous motors comprise a high-torque series motor.

12. plurality of synchronous motors of different kinds, each of said synchronous motors comprising:

a stator selected from a group of stators established by stacking cores of identical shape so that the heights of the stators of the group of stators are different than one another, said heights being multiple values of a fundamental height by a predetermined number in accordance with predetermined output torque specification values and predetermined rotor inertia specification values; and a rotor selected from a plurality of groups of rotors such that lengths of the rotors in each of the groups of the rotors are different than one another, said lengths being multiple values of a fundamental length by a predetermined number in accordance with the predetermined rotor inertia specification values, said rotors in each of the groups of rotors being provided with permanent magnets having residual magnetic flux density different than that of permanent magnets of the rotors in another of the groups of rotors in accordance with the predetermined output torque specification values, wherein said stator and said rotor are selected in accordance with a preset output torque specification value and a preset rotor inertia specification value in different combinations of the rotor and the stator for each of the different kinds of synchronous motors.

* * * * *